(12) United States Patent
Parastatidis et al.

(10) Patent No.: US 9,996,531 B1
(45) Date of Patent: Jun. 12, 2018

(54) CONVERSATIONAL UNDERSTANDING

(71) Applicant: Facebook, Inc., Menlo Park, CA (US)

(72) Inventors: Savas Parastatidis, Kirkland, WA (US); Benoit F Dumoulin, Palo Alto, CA (US); Antoine Raux, Cupertino, CA (US); Rajen Subba, Redwood City, CA (US); Stefan Nelson-Lindall, Mountain View, CA (US); Wenhai Yang, Redwood City, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days. days.

(21) Appl. No.: 15/084,292

(22) Filed: Mar. 29, 2016

(51) Int. Cl.
*G10L 21/00* (2013.01)
*G06F 17/27* (2006.01)
*G06F 17/24* (2006.01)
*G10L 15/22* (2006.01)

(52) U.S. Cl.
CPC ............ *G06F 17/279* (2013.01); *G06F 17/24* (2013.01); *G06F 17/2705* (2013.01); *G10L 15/22* (2013.01); *G06F 17/277* (2013.01)

(58) Field of Classification Search
CPC ................. G06F 17/28; G06F 17/2785; G06F 17/30654; G06F 17/30684; G06F 17/20864; G06F 3/167; G06F 17/27; G06F 17/2765; G06F 17/277; G06F 17/279; G06F 17/2881; G06F 17/30038; G06F 17/30056; G06F 17/30321; G06F 17/30386; G06F 17/30663; G06F 17/30705; G06F 17/30861; G06F 17/3087; G06F 17/3089; G06F 21/00; G06F 21/50; G06F 21/552; G06F 2203/0381; G06F 2209/543; G06F 3/048; G06F 3/04842; G06F 8/00; G06F 9/4443; G06F 9/54; G06F 9/542; G10L 15/22; G10L 15/063; G10L 15/1815; G10L 15/183; G10L 2015/223; G10L 2015/228; G10L 13/08; G10L 15/18; G10L 15/26; G10L 17/22; G10L 2015/225; G10L 2015/227; G10L 21/06
USPC .... 704/235, 275, 243, 257, 260, 270, 270.1, 704/9; 707/769, 706, 748, 766, 771; 709/203; 715/708; 719/318
See application file for complete search history.

(56) References Cited

U.S. PATENT DOCUMENTS

| | | | | |
|---|---|---|---|---|
| 7,194,444 B1 * | 3/2007 | Nichols | ..................... | G09B 5/00 434/219 |
| 8,873,813 B2 * | 10/2014 | Tadayon | ................... | G06K 9/00 382/118 |

(Continued)

*Primary Examiner* — Vijay B Chawan

(57) ABSTRACT

Exemplary embodiments relate to methods, mediums, and systems for managing a conversation. In an embodiment, a computer-implemented input interface is provided to receive an input comprising information in natural language. A dialog manager is configured to determine an intent of the input, determine information to fulfill the intent, and identify one or both of information available to the dialog manager or information that is unavailable to the dialog manager. A conversational understanding document documents the intent and the identified information. An output interface forwards the conversational understanding document towards a task completion handler separate and distinct from the dialog manager. Other embodiments are described and claimed.

20 Claims, 11 Drawing Sheets

(56) References Cited

U.S. PATENT DOCUMENTS

| | | | | |
|---|---|---|---|---|
| 8,965,787 B2* | 2/2015 | Bonev | | G06Q 30/00 705/14.49 |
| 9,548,050 B2* | 1/2017 | Gruber | | G06F 17/3087 |
| 9,589,565 B2* | 3/2017 | Boies | | G10L 17/22 |
| 2002/0087649 A1* | 7/2002 | Horvitz | | G06Q 10/107 709/207 |
| 2003/0005174 A1* | 1/2003 | Coffman | | G06F 9/4443 719/318 |
| 2003/0225825 A1* | 12/2003 | Healey | | G06F 8/00 709/203 |
| 2004/0098245 A1* | 5/2004 | Walker | | G06F 17/2881 704/1 |
| 2009/0292529 A1* | 11/2009 | Bangalore | | G06F 17/27 704/9 |
| 2011/0153322 A1* | 6/2011 | Kwak | | G10L 15/22 704/235 |
| 2011/0307496 A1* | 12/2011 | Jones | | G06F 17/30386 707/748 |
| 2012/0022872 A1* | 1/2012 | Gruber | | G06F 17/279 704/270.1 |
| 2012/0265528 A1* | 10/2012 | Gruber | | G10L 15/18 704/235 |
| 2014/0079297 A1* | 3/2014 | Tadayon | | G06K 9/00 382/118 |
| 2014/0096249 A1* | 4/2014 | Dupont | | G06F 21/00 726/23 |
| 2014/0201126 A1* | 7/2014 | Zadeh | | G06K 9/627 706/52 |
| 2014/0250145 A1* | 9/2014 | Jones | | G06Q 10/101 707/769 |
| 2014/0250378 A1* | 9/2014 | Stifelman | | G06F 3/048 715/708 |
| 2014/0278413 A1* | 9/2014 | Pitschel | | G10L 15/063 704/243 |
| 2015/0039316 A1* | 2/2015 | Tzirkel-Hancock | | G10L 15/22 704/275 |
| 2015/0120816 A1* | 4/2015 | Bertelsen | | G06F 3/04842 709/203 |
| 2015/0179168 A1* | 6/2015 | Hakkani-Tur | | G10L 15/22 704/257 |
| 2015/0356127 A1* | 12/2015 | Pierre | | G06F 17/30663 707/706 |
| 2016/0055240 A1* | 2/2016 | Tur | | G06F 17/277 707/706 |

\* cited by examiner

CONVERSATIONAL UNDERSTANDING

BACKGROUND

Systems for supporting human-computer interaction are increasingly becoming more sophisticated. Whereas humans have traditionally been restricted to interacting with computers in highly structured ways, advances in conversational understanding are allowing computers to process input that is provided in a natural language. Processing natural language inputs, particularly when the input requests the computer to perform a task, may be complex. Among other constraints, the computer may need to determine the nature of the requested task, identify information needed to perform the task, and solicit any unknown needed information from the user (or elsewhere).

Problematically, when these capabilities are combined together in a single component, it can become difficult or time-consuming to update the component to adapt to new types of tasks, to naturally converse with users in different manners, to provide third-party developers access to conversational understanding capabilities, and to identify potentially irrelevant information that may not need to be gathered.

SUMMARY

Exemplary embodiments relate to methods, mediums, and systems for managing a conversation and performing task completion. In an embodiment, a computer-implemented input interface is provided to receive an input comprising information in natural language. A dialog manager is configured to determine an intent of the input, determine target information to fulfill the intent, and identify one or both of information among the information that is available to the dialog manager or information that is not available to the dialog manager. A structured conversational understanding document documents the intent and the identified information. An output interface forwards the intent document towards a task completion handler separate and distinct from the dialog manager. Other embodiments are described and claimed.

DETAILED DESCRIPTION

Figure 1:
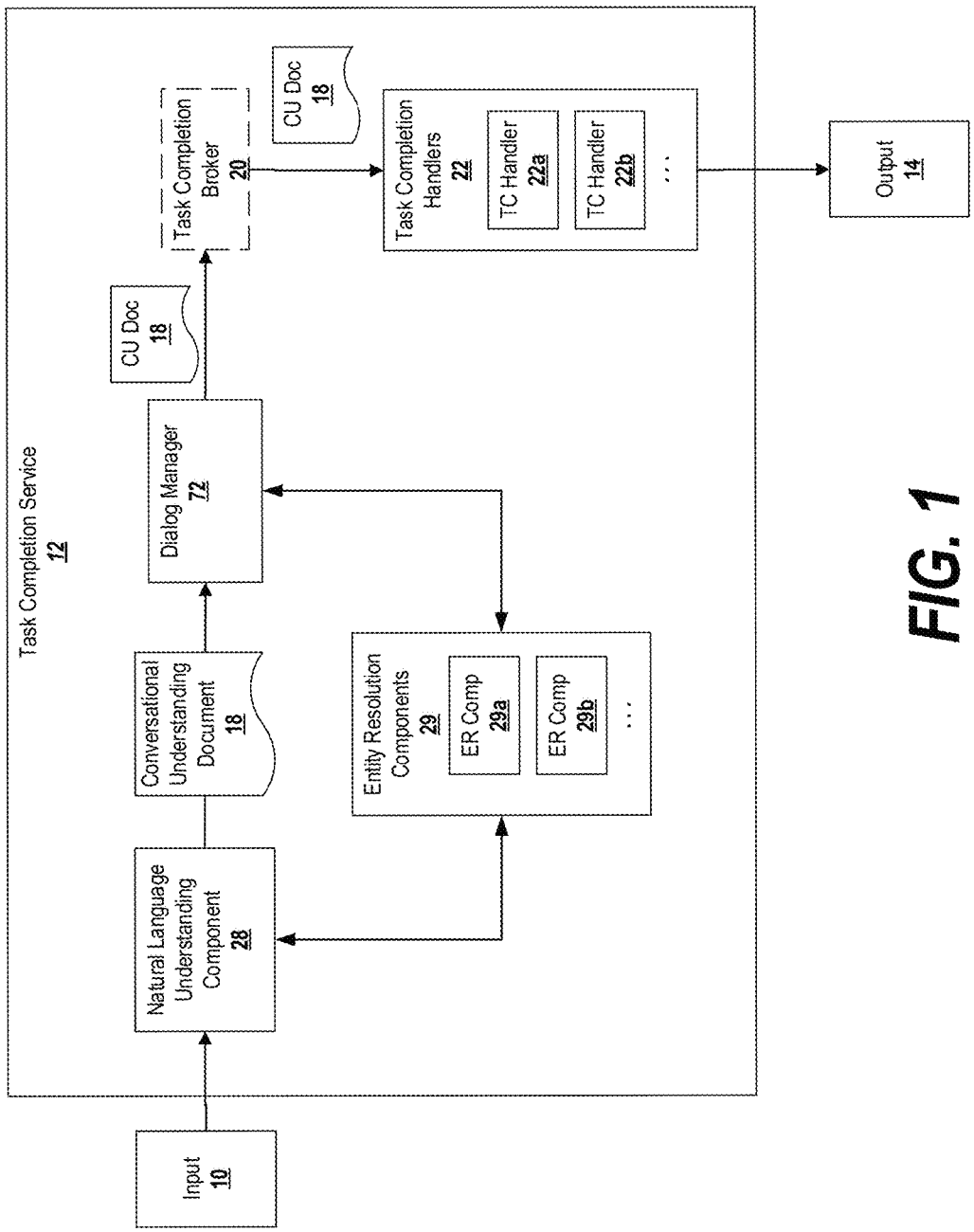
FIG. 1 depicts an overview of an exemplary system for supporting conversational experiences.

In general, exemplary embodiments relate to methods, mediums, and systems for supporting conversational experiences, and to augment those experiences by providing additional relevant information or performing a requested task.

In particular, exemplary embodiments relate to techniques for supporting conversational experiences so as to complete a task, possibly in the presence of incomplete information. An input is provided to a natural language understanding (NLU) unit, which identifies the intent of the input. The intent is provided to a dialog manager, which determines, if possible, what additional information is needed to fulfill the input and maintains the conversation state. An entity resolution component callable by the NLU unit and/or the dialog manager may map part of the text input to entities, such as social networking graph entities. A task completion (TC) handler guides a conversation to obtain any necessary missing information. Further conversational information is provided to the dialog manager, but the separate TC handler is responsible for determining what missing information to seek, and in what order. Because the TC handler is a separate entity, third-parties can provide different TC handler plugins that allow for new intents to be handled, allow for different vendors to guide conversations in different ways, and delay decisions about the user experience for as long as possible.

According to exemplary embodiments, a NLU component identifies the intent of an input. The intent of the input represents a classification or categorization of the input based on the type of question asked or the type of task that the input requests. For example, one intent may be to request movie times, while another intent may be to check a weather forecast.

The intent is provided to a dialog manager, which determines what additional information is needed to fulfill the input and maintains a conversation state. In exemplary embodiments described herein, the operation of guiding the conversation is carried out by a TC handler separate and distinct from the dialog manager. The TC handler determines what information to seek, and at what time. Updated information prompted by the TC handler is provided to the dialog manager.

Because the handler is provided as a separate entity from the dialog manager, the functionality of managing the conversation state and resolving information to entities is separated from the functionality of deciding how the conversation should move forward. This separation makes it easier to provide new or updated handlers as third-party plugins (it may be appreciated, however, that the handlers may be implemented by the same entity as the one that implements the dialog manager). As a result, new functionality may be quickly deployed without the need to rebuild the task handling service as a whole, and the task handler may use different plugins to handle the same task in different ways.

There are a number of advantages of such a system. For example, new intents can be handled by specifying new intent types, without the need to rebuild the system. Furthermore, different vendors may provide different handler plugins that guide conversations in different ways. Moreover, decisions about the user experience are delayed for as long as possible in the process flow, which potentially allows for some missing information to be inferred without directly querying the user.

FIG. 1 shows an overview of an exemplary task completion service 12. An input 10 including, for example, text in a natural language is provided to the task completion service 12. The input 10 may include a question, a request to perform a task, and/or information used to answer the question or perform the task. For example, the input 10 may include a query such as "when does the new Superman movie play?" or a request such as "purchase tickets for the new Superman movie?"

In the above examples, some information has been provided for answering the question or performing the task (e.g., that the movie is new and involves Superman), but the provided information may be insufficient to fully answer the question or perform the task. For instance, the task completion service 12 may need to know where the user wishes to see the movie, and at about what time. Accordingly, the task completion service 12 may guide a conversation to retrieve supplemental information, preferably in a natural conversational style.

An output 14 may be provided in a natural language (e.g., a language that has developed naturally in use, as contrasted with structured computer language). The output 14 may include an answer to the question (e.g., "Superman plays at 7:00 at the cinema down the street from you"), confirmation that the task has been performed (e.g., "I bought you tickets. Here's your receipt!") or a next iteration in the conversation (e.g., "Where would you like to see the movie?").

In order to generate the output 14, the input 10 may be provided to a natural language understanding component 28, which classifies the input 10 based on an intent of the input 10. In the above example, the natural language understanding component 28 might classify the input 10 as a request for movie times or a request to perform the task of purchasing movie tickets.

The natural language understanding component 28 may generate a conversational understanding (CU) document 18, which represents structured data that can be processed by a task completion handler 22 that services the input 10. The CU document 18 may include an identification of the intent of the input 10, any information that is known about the input 10, missing information that may be useful to address the input 10, etc.

Optionally, the CU document 18 may be provided to a broker 20. In cases where more than one task completion handler 22 exists for servicing the input 10, the broker may select one of the possible task completion handlers 22 to generate the output 14. For example, multiple movie service plugins may exist, and the broker 20 may select one of the movie service plugins to answer the question or purchase the tickets.

The task completion handler 22 identifies any missing information from the CU document 18, and guides a conversation in a natural language to obtain the missing information. When sufficient information has been collected to service the request or answer the question, the task completion handler 22 may provide an answer or fulfill the request.

Classification of the intent of the input and identification of present and missing information may be handled by the dialog manager 72. The dialog manager 72 may also maintain a conversational state of a conversation managed by the task completion handler 22 (for example, the dialog manager 72 may store any already-captured information about the input 10, and may update the CU document 18 with all available information). Meanwhile, selection of which missing information to pursue, the order to pursue the missing information, guidance of the conversation, and final servicing of the request may be handled by the task completion handler 22. Thus, separation is maintained between the capabilities of the dialog manager 72 and the task completion handler 22.

As a result, different plugins may be employed as part of the task completion handler 22, including third-party plugins. Moreover, the dialog manager 72 may be extended using third-party intent resolution handlers. This allows new intents to be serviced without rebuilding the entire task completion service 12 and allows different vendors to handle the same input 10 in different ways (e.g., using different conversational styles or different services).

Furthermore, this exemplary setup allows decisions about which information to pursue to be delayed to as late as possible in the processing flow (e.g., being handled by the task completion handler 22 instead of the dialog manager 72), which means that the task completion handler 22 may be able to infer some information or determine that some information identified by the dialog manager 72 is not relevant in the present context. For instance, in the above example, the task completion handler 22 may include a plugin provided by a movie application that only services theaters in a limited geographic area. If the movie Superman is only playing at one theater serviced by the plugin, then it may not be necessary for the task completion handler 22 to ask where the user would like to see the movie, and the handler 22 may refrain from asking the user questions related to location. This may not be possible in a system in which the decision as to which information to pursue is handled by a general-purpose dialog manager 72.

These and other features and advantages are described in the detailed block diagrams and flowcharts below. Before these exemplary embodiments are addressed, a general note on data privacy is provided.

Data Privacy

Some embodiments described herein make use of data that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Next, a detailed description of the components of the conversational understanding system is provided.

Natural Language Understanding Component, Dialog Manager, and Entity Resolution

Figure 2A:
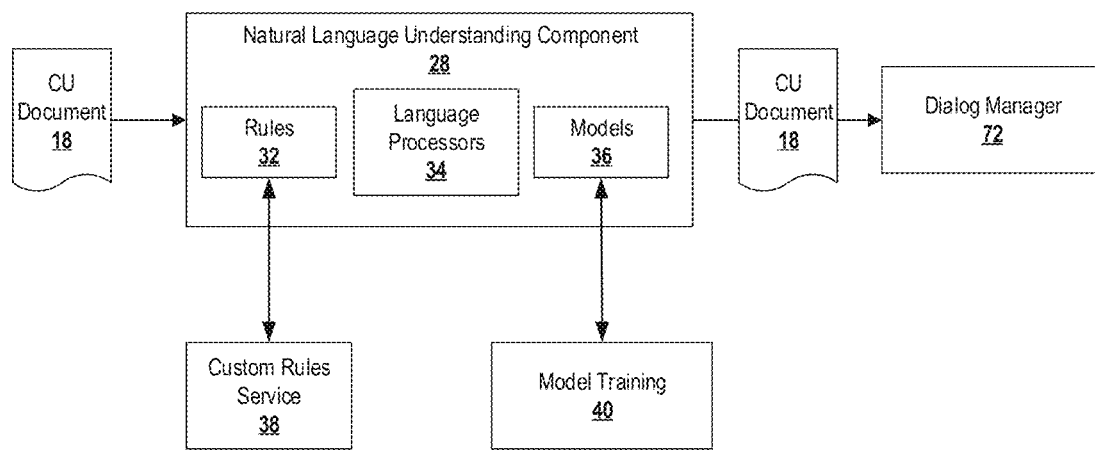
FIGS. 2A-2B depict the exemplary natural language understanding component of FIG. 1 in more detail.
Figure 3:
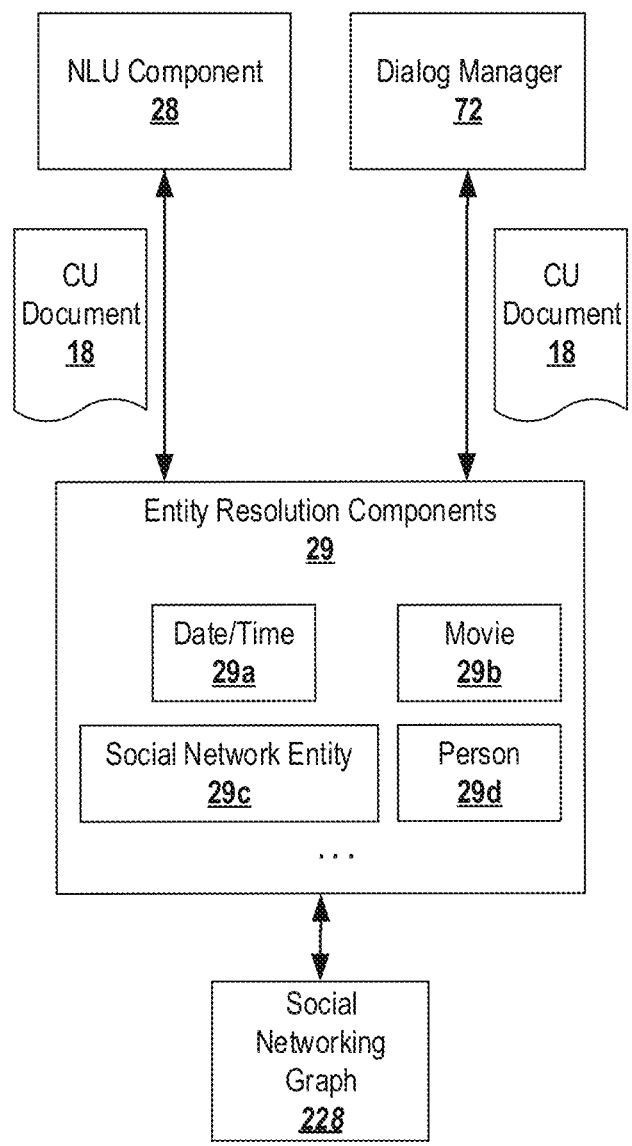
FIG. 3 depicts the entity resolution component of FIG. 1 in more detail.
Figure 4:
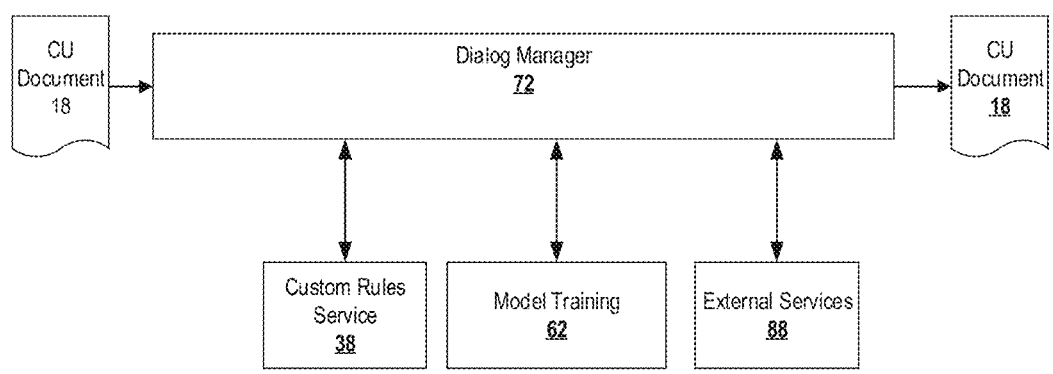
FIG. 4 depicts the exemplary dialog manager of FIG. 1 in more detail.

FIG. 2A illustrates an exemplary illustration of a natural language understanding (NLU) component 28, which works with the exemplary dialog manager 72 depicted in FIG. 4 to determine the intent of the input 10, maintain a conversational state, and generate a CU document 18 to be provided to the broker 20 and/or the task completion handler 22. The NLU component 28 and dialog manager 72 may consult one or more entity resolution components 29, as shown in FIG. 3, to resolve any entities in the input 10.

The goal of the NLU 28 and dialog manager 72 is to analyze the input 10 and fill in as many informational gaps as possible, given the information available to the respective components.

Initially, the NLU component 28 generates a CU document 18 with a unique identifier. The document contains all the information for the incoming request known to the NLU component 28. For example, the CU document 18 may include a partner ID identifying where the input 10 originated (e.g., an application or service), a viewer context, natural language text that was provided as part of the input 10, an ID for the language of the natural language text, etc. The CU document 18 is passed through the natural language understanding (NLU) component 28 and to the dialog manager 72.

FIG. 2A illustrates an exemplary NLU component 28 hosting custom rules 32, language processors 34, and trained models 36 which are composed into flows to meet the requirements of various partners. The NLU component 28 produces intent candidates (e.g., possible categories or classifications of tasks/questions) and/or a structured representation of the input natural language text which will be further processed by the intent service 16.

Next, a dialog manager 72 processes the output of the language processing steps performed by the natural language understanding component 28 and decides on next steps, such as further target information that is needed or useful to service the request or answer the question in the input 10. A description of suggested next steps, such as information to be requested, may be recorded in the CU document 18 that may be returned to the original caller or provided to a task completion handler 22. This information may be used to guide a back-and-forth conversation in which further information is solicited from a user.

The dialog manager 72 may have access to instances of the CU document 26 from previous interactions. For example, in an embodiment implemented in a social networking context, each such CU document 26 may be stored in a user's social networking graph. This way, the dialog manager 72 might use that earlier information to reconstruct a conversation and aggregate available information about a request or question.

Alternatively, or in addition, other ways of establishing a conversational context may also be used (e.g. retrieving a conversation history in a messaging program or other applications or interfaces for conducting a conversation).

The natural language understanding component 28 is now described in more detail.

Natural Language Understanding Service

Figure 2B:
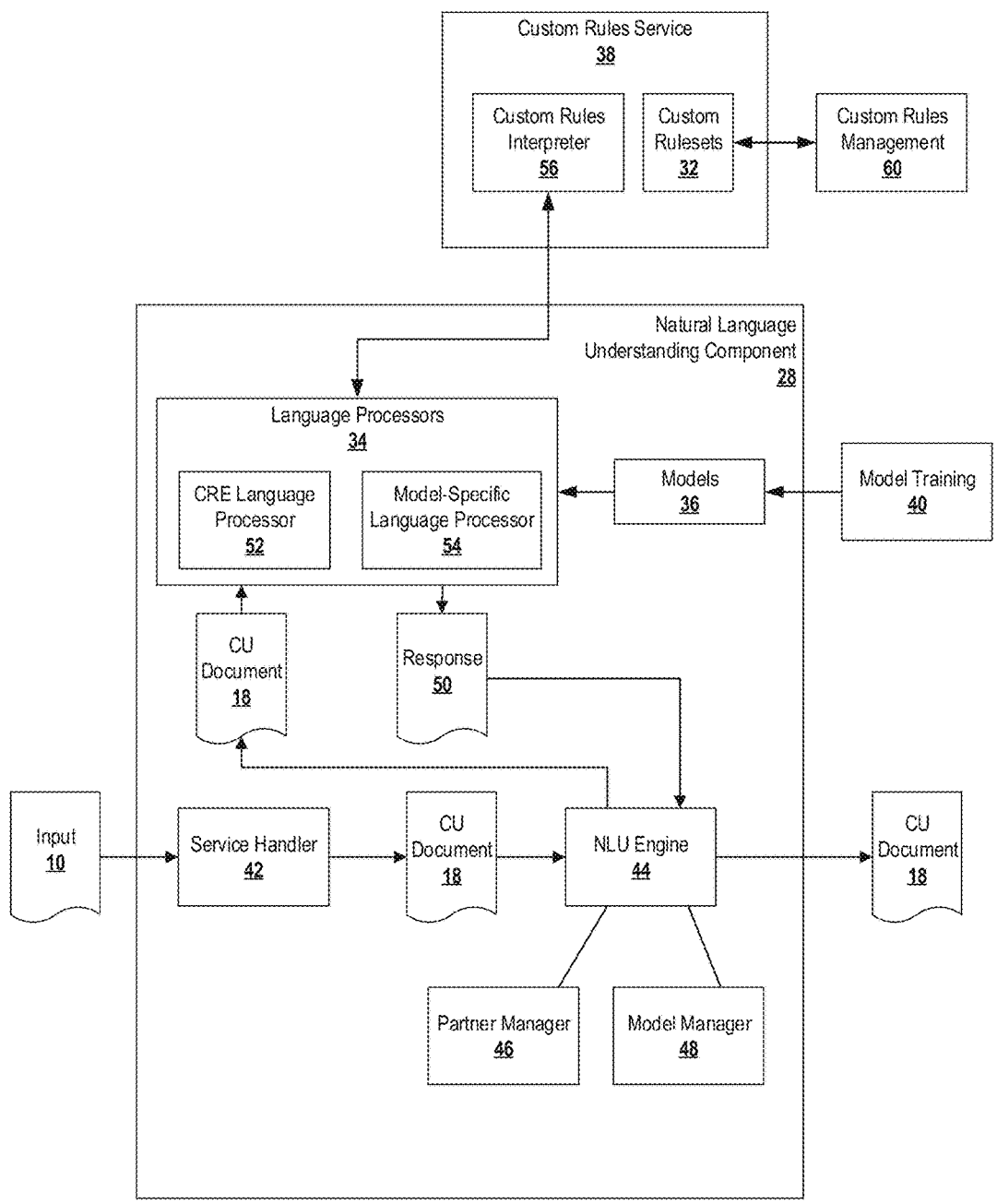

FIG. 2B depicts the natural language understanding (NLU) component 28 in more detail. The NLU component 28 is responsible for processing some input text (considering some context). It produces intent candidates and/or structured representation of the input text which will be further processed by the intent service 16.

As previously noted, the NLU component 28 may include custom rules 32 for one or more domains, which may be created through a custom rules engine (CRE) service 38. Given a specified partner ID, as discussed above, the CRE service 38 may evaluate the input against a custom rules set for that particular partner.

The NLU component 28 may also host machine-language-trained models 34 for language processing. The models 34 may be trained by one or more model trainers 40. The CRE service 38 and the models 34 may be composed together to form language processors 34 that implement partner-specific language processing flows.

The initial input 10 may be received by a service handler 42, which generates a CU document 18 and hands the CU document 18 off to an NLU Engine 44. Based on consultation with the language processors 34, a partner manager 46, and a model manager 48, the engine 44 creates an updated context document 18 (which may include the original input document 10).

Using the Partner Manager (PM) component 46, a Language Processor (LP) 34 is chosen to address the request. The Partner Manager 46 maintains a map between third-party partners and their specific implementation of a Language Processor 34 interface. Furthermore, a Model Manager (MM) 48 is passed, if necessary, to the partner-specific LP 34 so that information about all the deployed models 36 is available. The partner-specific LP 34 can utilize other processors 34 that are available in order to implement the processing on the context (e.g. SVM, CRF, Travel-specific SVM). The response of each Language Processor 34 may be added to the CU document 18 to generate a response 50, which is then converted into an updated CU document 18 by the NLU engine 44.

The language processors 34 may include a CRE language processor 52 and/or model-specific language processors 54, that are trained by the model trainer 40. There may also be a Language Processor 34 that acts as a bridge between the NLU service 28 and a predictor service for Deep Neural Network (DNN)-trained models.

Upon startup of the service, the Model Manager 48 indexes all the metadata about the models 36 that are available. Similarly, the Partner Manager 46 loads all the partner-specific Language Processors 34, which in turn instantiate all the Language Processors 34 they are using so that the models 36 are loaded in memory.

A new partner on-boarding may require the implementation of a new partner-specific LP 34 and a new deployment of the service 12. To avoid this coupling, a declarative mechanism may be provided for defining partner-specific compositions of our Language Processors 34. Such compositions may be loaded dynamically, without requiring a new deployment of the service 12.

As noted above, the language processors 34 may make use of custom rulesets 32, which may be accessed through a custom rules service 38. The custom rules service 38 may include a custom rules interpreter 58 for accepting an input from the language processors 34 and applying the custom rulesets 32. A custom rules management component 60 may provide an interface to allow new custom rulesets 32 to be easily defined and/or updated.

Alternatively, or in addition, in the absence of an appropriate ML-trained model 36, custom rules 32 may be used to process the input text and generate an intent. The custom rules 32 may also generate a candidate response for the response document 50.

Entity Resolution

The NLU component 28 may consult with one or more entity resolution components 29 in order to resolve entities in the input 10. An exemplary entity resolution component 29 is depicted in FIG. 3.

The entity resolution component 29 maps elements of the input 10 to specific entities or data structures. For example, if the input 10 includes the keyword "tomorrow," an entity resolution component 29 may map the keyword to a particular computational "date" object representing the following day. Similarly, if the input 10 includes the key phrase "tomorrow morning," an entity resolution component 29 may further map the phrase to a "time" object representing a default morning time (e.g., a date/time object representing the following day at 9:00 AM). Other examples are also possible: named people may be mapped to users of a social network, particular movies may be mapped to a data object representing the movie in a database, etc.

FIG. 3 depicts several examples of entity resolution components 29, including a date/time component 29a, a movie component 29b, a social network entity component 29c, a person component 29d, etc. Other examples might include, for instance, a location resolution component (e.g., mapping the term "Seattle" to a data object representing a Seattle, Wash.), among other possibilities. To facilitate entity resolution, the entity resolution components 29 may connect to external entities, such as a social networking graph 228 (described in more detail in connection with FIG. 11). The social networking graph 228 may be used to resolve social network entities 29c such as users, businesses, interest pages, etc., but may also be used to resolve other types of entities as well (e.g., the movie component 29b may resolve movies to a particular node of the social networking graph 228b representing a movie, or to a social networking page for the movie).

Dialog Manager

FIG. 4 illustrates an exemplary dialog manager 72. As shown in FIG. 4, the CU document 18 produced by the NLU component 28 may be provided to the dialog manager 72. The dialog manager 72 analyzes the CU document 18, potentially using local or third-party intent resolution handlers, in order to determine next steps that may be taken in the conversation.

The dialog manager 72 may be configured to provide application-specific user experiences, and may call a particular application programming interface (API) function as specified in the intent resolution handlers for a given intent. The intent resolution handlers may identify target information for a particular intent, and different intent resolution handlers may handle different intents. The target information identified by the dialog manager 72 may be bundled into the CU document 18 and provided to a task completion handler that guides a conversation to obtain the missing information and/or service the request.

The intent resolution handlers may include different handlers for servicing different intents and identifying any information needed or useful for fulfilling the intents ("target information").

New intents may be serviced by providing new intent resolution handers. A new intent resolution handler may be constructed, for example, by specifying a language model 34 to use for an intent associated with the intent resolution handler, by specifying any dialog requirements for the intent resolution handler (e.g., information that is used to fulfill the requests), and optionally an application programming interface (API) endpoint to call when dialog involving the intent is required. This and other information may be supplied for each of the intent resolution handlers, and the dialog manager 72 may consult this information when a particular intent is identified in the CU document 18.

The dialog manager 72 may also interact with external services 88 in order to fill in any gaps that the language processors did not cover. Alternatively, or in addition, if there are multiple candidate interpretations from the language processors 34, the dialog manager 72 might decide to reach out to external services 88 to see which of those interpretation has a higher chance of returning a result.

The dialog manager 72 may employ one or more custom rules and may therefore consult the custom rules service 38. Furthermore, the dialog manager 72 may make use of one or more models, and may therefore consult a model trainer 62 (similar to the model trainer 40 as depicted in connection with the NLU component 28 of FIG. 2B; however, the dialog manager 72 may make use of different types of models than the models 36 of the NLU component 28).

The output of the dialog manager 72 may be a CU document 18, which may be forwarded towards a task completion handler 22. As noted above, at each step in a conversation, previous messages in the conversation remain available to the components of the service 12, including the dialog manager 72. As a result, the dialog manager 72 may access previous messages and/or locally store any relevant information about the conversation, in order to maintain a full state of the conversation. The dialog manager 72 may update the CU document 18 to include all relevant information that has been gathered during the course of the conversation as the conversation progresses. Thus, the task completion handler 22 may be a stateless entity and can always be provided with the most up-to-date information by the dialog manager 72.

Task Completion Handlers

Figure 5:
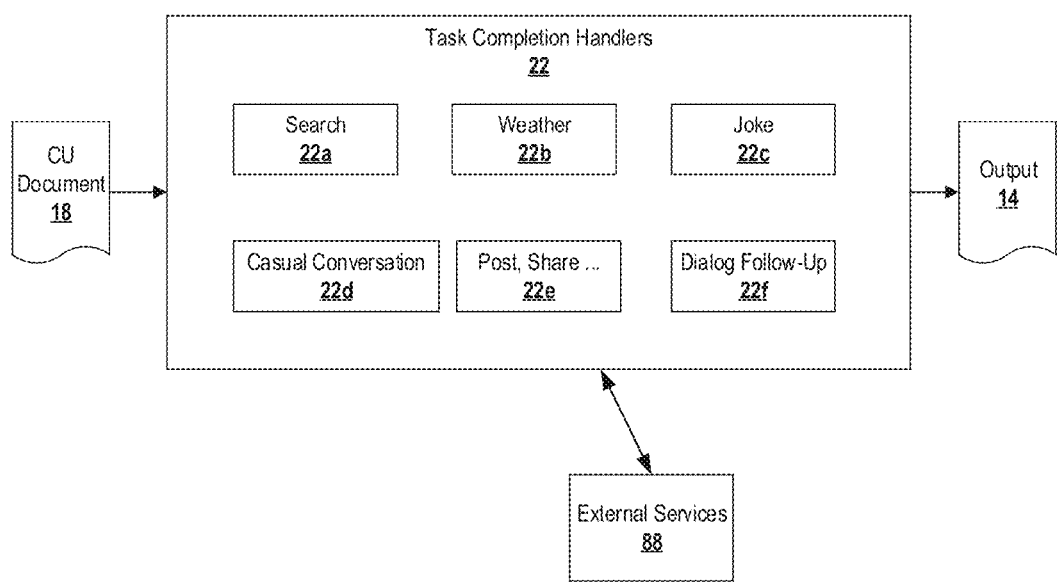
FIG. 5 depicts the exemplary task completion handlers of FIG. 1 in more detail.

FIG. 5 illustrates exemplary task completion handlers 22. The task completion handlers 22 support user experiences by providing an output 14 (e.g. some language, the result of an operation, etc.) that is performed as a result of the identified intent. The partner ID given at the beginning of the processing pipeline may define the behavior of the task completion handlers 22.

When an input CU document 18 is received specifying a particular intent, a task completion handler 22 responsible for the identified intent will be dispatched to generate the appropriate response. The handler 22 may initially consult the CU document 18 in case a candidate response is already there (e.g., if a candidate response was inserted by one of the rules in the ruleset 32). Exemplary task completion handlers 22 depicted in FIG. 5 include a search handler 22a, a weather handler 22b, a joke handler 22c, a casual conversation handler 22d, a social networking handler 22e, and a dialog follow-up handler wwf (although other possibilities exist as well). The task completion handlers 22 may also interact with external services 88 to resolve ambiguous information or to acquire information not specified in the input 10 without the need to interact with a user.

A task completion handler 22 may be provided by the same entity that provides the dialog manager 72, or may be provided by a third party. In such an event, the dialog manager 72 and the task completion handler 22 may be hosted in separate locations and may communicate with each other over a network, such as the Internet.

The task completion handlers 22 are responsible for evaluating the information in the CU document 18 in order to identify which potentially relevant information still needs to be collected before the intent can be serviced. A given task completion handler 22 decides which information to pursue, and in what order. The task completion handler 22 also decides the particular language to employ in conducting the conversation, so that different task completion handlers 22 may possess different conversational styles.

Data Structures

Figure 6:
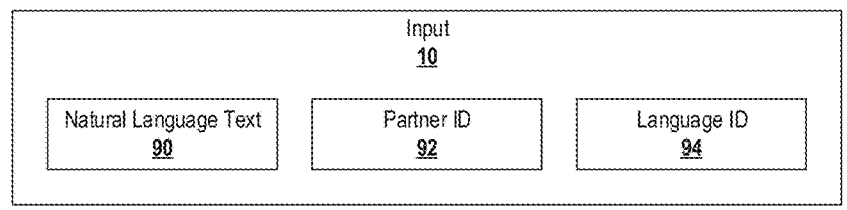
FIG. 6 depicts an input format suitable for use with exemplary embodiments.
Figure 7:
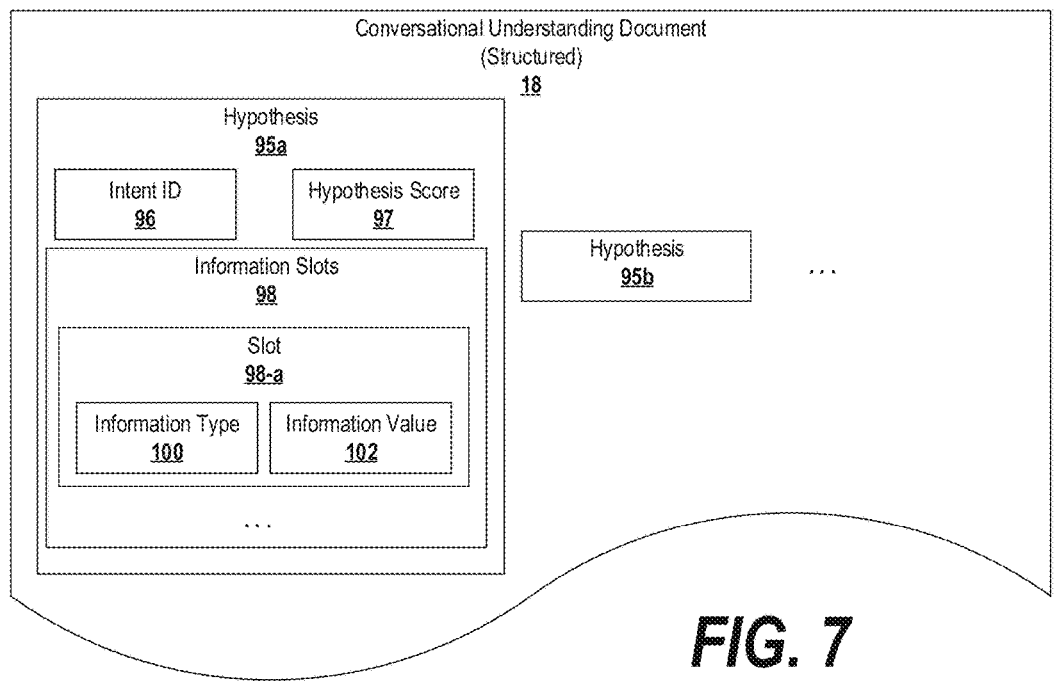
FIG. 7 depicts an exemplary format for a conversational understanding document suitable for use with exemplary embodiments.
Figure 8:
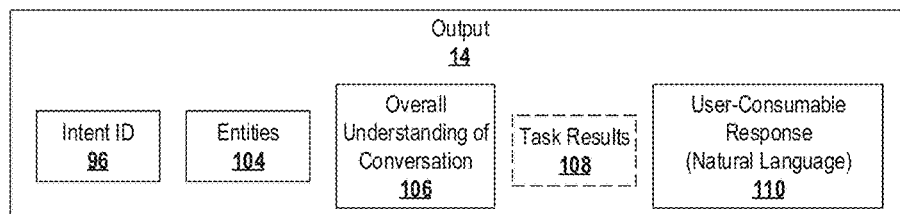
FIG. 8 depicts an output format suitable for use with exemplary embodiments.

FIGS. 6-8 depict exemplary data structures suitable for use in exemplary embodiments.

FIG. 6 depicts an exemplary input 10. The input 10 may include natural language text 90, such as a query or instruction from a user written in a natural, conversational style.

The input 10 may also include a partner ID 92 that identifies a partner that originated the request or that is associated with the request. For example, if the user accesses the service 12 through a movie application, the partner ID 92 may be an identifier of the movie service associated with the movie application. The partner ID 92 and/or the natural language may be analyzed to identify the intent of the input 10.

The input 10 may also specify a language ID 94, which identifies the language of the natural language text 90. The language ID 94 may be used to identify which language models to apply to the natural language text 90.

FIG. 7 depicts an exemplary CU document 18, which is a structured document (e.g., not written in a natural language) intended for internal consumption by the service 12.

The CU document 18 may include an intent ID 96, which identifies the intent of the input 10. The intent ID 96 may be determined based on one or both of the natural language text 90 or the partner ID 92.

The CU document 18 may further includes fields or slots 98 for information. The slots 98 may include one slot each for information deemed to be relevant to processing the input 10 (e.g., as determined by the intent resolution handlers 62). For example, if the identified intent is a request for movie times, then the intent document 18 may include information slots 98 for the name of the movie, the time and/or date for which show times are requested, and a location at which the user would like to see the movie. To this end, the information slots 98 may each include a field for the type of information (e.g., "location") and a field 102 for holding the value of the information (e.g., "Seattle, Wash."). The information value field 102 may be left blank if the information is not yet known. Thus, if the task completion handler receives an intent document 18 having blank value fields 102, then the task completion handler may be aware that some information useful or necessary for processing the request has not yet been provided. The task completion handler can then decide whether to request the information and, if so, in what order missing information should be acquired.

In some cases, the intent of the input 10 may be ambiguous, such that more than one intent may be possible. For example, if a user provides an input of "I want to watch Superman," the user might want to go to a movie theater to see the movie, or might want to watch the movie at home on a cable channel. This could therefore result in a first intent of "movie search" and a second intent of "TV search." Each of these may be treated as a separate hypothesis, and the CU document 18 may include data structures 95*a*, 95*b*, . . . corresponding to different hypotheses. Each data structure 95*a*, 95*b*, . . . may include a hypothesis score 97, which represents a likelihood or probability for the hypothesis. The hypothesis score 97 may be assigned, for example, by the dialog manager 72. The dialog manager 72 or the broker 20 may select the hypothesis with the highest score 97 and forward the CU document 18 to the appropriate handler 22 for that hypothesis. Alternatively or in addition, the dialog manager 72 or the broker 20 may use a decision making algorithm to resolve the ambiguity based on the identified hypotheses. For example, the dialog manager 72 or the broker 20 may submit a query to the user asking which of the hypotheses is correct (e.g., "do you want to see a movie on your device or go to the theater?").

FIG. 8 illustrates an exemplary output 14. The output 14 includes the intent ID 96 that identifies the intent of the input 10. Furthermore, any entities 104 identified by the entity resolution component 29 may be specified in the output 14.

The output 14 may also include fields representing an overall understanding of the conversation 106 (e.g., the information from the information slots 98). This information may be used at the client side or by the dialog manager 72 to quickly regenerate the state of the conversation. It is noted that although the task resolution handler 22 may package the information form the information slots 98 (as received in the CU document 18) into the output 14, the handler 22 may refrain from maintaining the state of the conversation itself. This allows the handler 22 to be stateless and frees the handler 22 from the need to identify which information has or has not yet been provided, thereby facilitating interoperation between the dialog manager 72 and third-party handlers 22.

The output 14 also includes a user-consumable response 110 (e.g., natural language text intended for human consumption) as generated by the task completion handler 22. In some embodiments, the response 110 may be paired with the task results 108 to provide a full response to the user.

Exemplary Method

Figure 9:
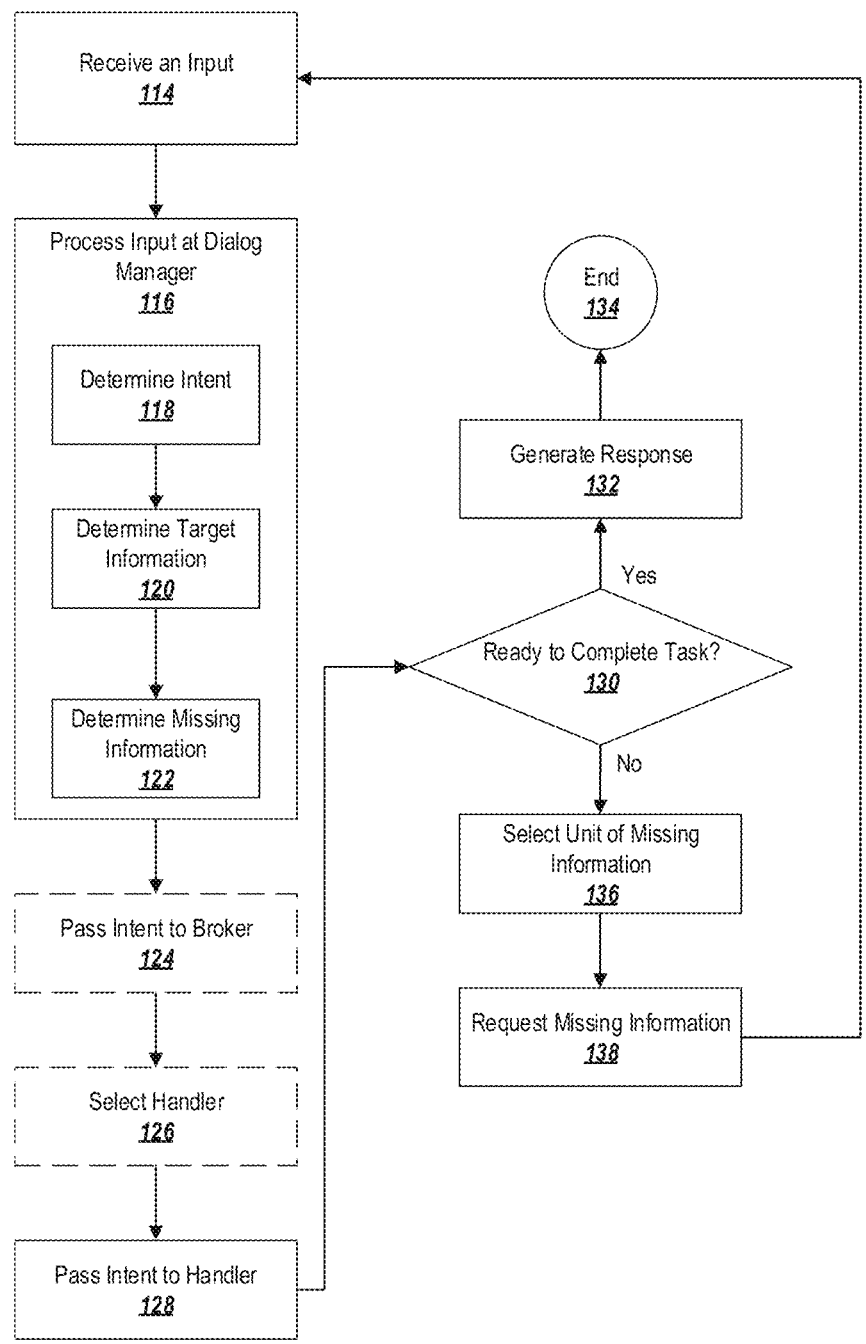
FIG. 9 is a flowchart describing an exemplary method for processing natural language and guiding a conversation.

FIG. 9 depicts an exemplary method suitable for use with exemplary embodiments. The method may be implemented as conversational understanding logic 112 in the form of instructions stored on a non-transitory computer readable medium.

At block 114, an input may be provided to the task completion service. The input may be in the form of natural language text that presents a request for information, a request to perform a task, and/or information that may be used to fulfill a request. The input may also include a partner ID specifying a partner from which the input originated or otherwise associated with the input. The input may also include a language ID that specifies a language of the natural language text.

At block 116, the input may be processed at a dialog manager of the task completion service. Block 1116 may involve multiple sub-operations. For example, processing the input may involve determining an intent of the input at block 118. The intent may be determined based on a partner ID provided with the input and/or by processing the natural language text of the input to identify the intent of the text (e.g., in view of one or more keywords and/or one or more rules). Processing the input may further include determining any target information that is necessary or useful for servicing the intent at block 120. For example, the dialog manager may consult one or more intent resolution handlers that describe the information necessary or useful for processing the intent. The dialog manager may also identify any information contained in the natural language text of the input, in order to update the conversational state.

Any target information that is deemed useful or necessary, as identified in block 120, may be analyzed in view of existing information accessible to the dialog manager (in the present input and any previous inputs in the conversation).

For example, because the dialog manager maintains the conversational state including previous communications in the conversation, the dialog manager may identify any information that was identified as useful or necessary in block 120, but which is already present in the conversational history. Based on this determination, the dialog manager may identify any necessary or useful information that has not already been gathered, and identify this as missing information in block 120.

As a result of processing the input at block 116, the dialog manager may produce an intent document. Optionally, the dialog manager may pass the intent document to a broker at block 124. The broker may, at block 126, determine whether multiple handlers exist for servicing the intent, and may select one of the handlers to process the intent document. For example, the broker may consult one or more user preferences to determine if the user has a preferred handler for servicing requests of this type. Alternatively or in addition, the natural language text of the input may specify a preferred handler. Still further, different handlers for the same intent may have different informational requirements, and the broker may select the handler for which the minimum amount of additional information needs to be specified. One of ordinary skill in the art will understand that other techniques for selecting a preferred handler may also be employed.

At block 128, the intent may be forwarded to the selected handler. If the handler is integrated into the task completion system, then the intent document may be provided directly to the selected handler. If the handler is provided by a third party plugin, then the dialog manager or broker may connect to the plugin (e.g., via a network). In either case, the dialog manager or broker may provide the intent document to the handler by calling an API method for the handler, as specified in the intent resolution handler for the specified intent.

Processing may then proceed to block 130, where the handler may determine whether it has sufficient information to complete the original task or answer the original question. For example, the handler may determine whether any necessary or useful information is missing from the intent document. It is noted that it may not be necessary to provide all information specified in the intent document (e.g., some information may be determined by the handler to be irrelevant in the present context). If sufficient information is available to complete the task or answer the query, then at step 132 the task handler may generate a response, and processing may end at step 134.

If the handler is not ready to complete the task at block 130, then at block 136 the handler may select a piece of missing information to request from the user. Each handler may include its own internal logic for determining which piece of information to request, in what order, and how to request the information. Processing may then proceed to block 138, when the handler generates a response that requests the missing information. Processing may then return to step block, where a new input (e.g., in response to the request for missing information) is received.

Network Embodiments

Figure 10:
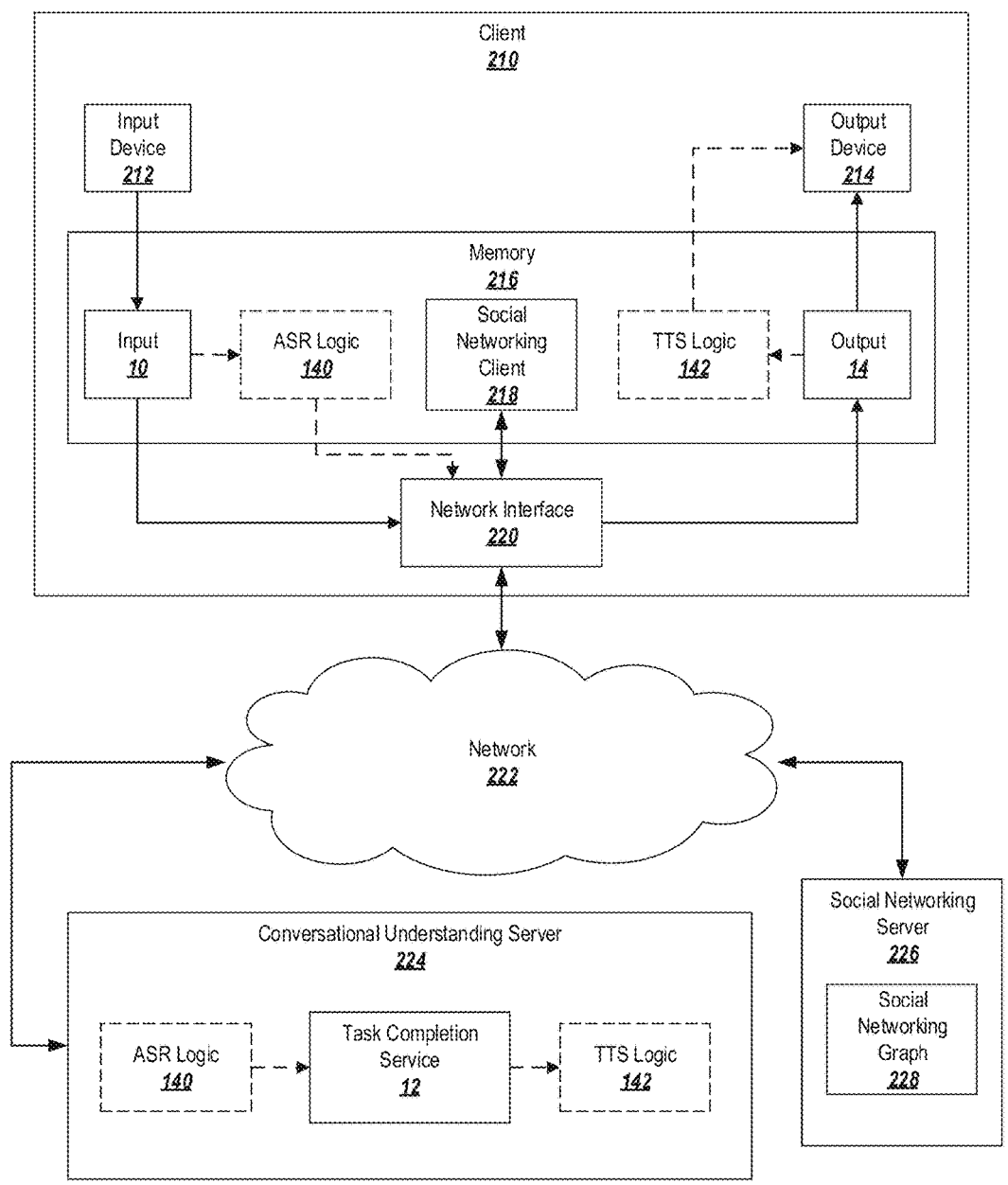
FIG. 10 depicts an exemplary network embodiment.

FIG. 10 illustrates an exemplary network environment in which some or all of the embodiments may be implemented.

A user may interact with a client 210, which may be (for example) a personal computer, tablet, mobile phone, special-purpose translation device, etc. In some embodiments, the client 210 does not require interaction from a user.

The client 210 may include one or more input devices 212 and one or more output devices 214. The input devices 212 may include, for example, microphones, keyboards, cameras, electronic pens, touch screens, and other devices for receiving an input. The output devices 214 may include a speaker, a display device such as a monitor or touch screen, and other devices for presenting an output.

In some embodiments, the input from the input devices 212 may be in the form of an input 10 that is being sent to a task completion service 12 for processing.

The client 210 may include a memory 216, which may be a non-transitory computer readable storage medium, such as one or a combination of a hard drive, solid state drive, flash storage, read only memory, or random access memory. The memory 216 may a representation of an input 10 and/or a representation of an output 14, as well as one or more applications. For example, the memory 216 may store a social networking client 218 that allows a user to interact with a social networking service.

The input 10 may be textual, such as in the case where the input device 212 is a keyboard. Alternatively, the input 10 may be an audio recording, such as in the case where the input device 212 is a microphone. Accordingly, the input 10 may be subjected to automatic speech recognition (ASR) logic 140 in order to transform the audio recording to text that is processable by the task completion service 12. As shown in FIG. 10, the ASR logic 140 may be located at the client device 210 (so that the audio recording is processed locally by the client 210 and corresponding text is transmitted to the conversational understanding server 224), or may be located remotely at the conversational understanding server 224 (in which case, the audio recording may be transmitted to the conversational understanding server 224 and the conversational understanding server 224 may process the audio into text). Other combinations are also possible—for example, if the input device 212 is a touch pad or electronic pen, the input 10 may be in the form of handwriting, which may be subjected to handwriting or optical character recognition analysis logic in order to transform the input 10 into processable text.

Similarly, a resulting output 14 from a task completion system 12 may be in the form of text. In some embodiments, the desirable end form of the output may be something other than text, such as an audio representation of the translation. Accordingly, the output 14 may be subjected to text-to-speech (TTS) logic 142 in order to transform the text into an audio recording that is presentable by the output devices 214. As shown in FIG. 10, the TTS logic 142 may be located at the client device 210 (so that the output text is processed locally by the client 210 and corresponding audio is sent to the output devices 214), or may be located remotely at the conversational understanding server 224 (in which case, text may be processed at the conversational understanding server 224 and the resulting audio recording may be transmitted to the client 210). Other combinations of processing logic are also possible, depending on the desired final form for the output 14.

The client 210 may be provided with a network interface 220 for communicating with a network 222, such as the Internet. The network interface 220 may transmit the input 16 in a format and/or using a protocol compatible with the network 222 and may receive a corresponding output 28 from the network 222.

The network interface 220 may communicate through the network 222 to a conversational understanding server 224. The conversational understanding server 224 may host the above-described task completion service 12.

The network interface 220 of the client 210 may also be used to communicate through the network 222 with a social networking server 226. The social networking server 226 may include or may interact with a social networking graph 228 that defines connections in a social network. Furthermore, the conversational understanding server 224 may connect to the social networking server 226 for various purposes, such as retrieving training data from the social network. The client 210 may provide the input 36 to, and may receive the output 18 from, the social network (e.g., as a translated post, article, etc.).

A user of the client 210 may be an individual (human user), an entity (e.g., an enterprise, business, or third-party application), or a group (e.g., of individuals or entities) that interacts or communicates with or over the social-networking server 226. The social-networking server 226 may be a network-addressable computing system hosting an online social network. The social-networking server 226 may generate, store, receive, and send social-networking data, such as, for example, user-profile data, concept-profile data, social-graph information, or other suitable data related to the online social network. The social-networking server 226 may be accessed by the other components of the network environment either directly or via the network 222.

The social-networking server 226 may include an authorization server (or other suitable component(s)) that allows users to opt in to or opt out of having their actions logged by social-networking server 226 or shared with other systems (e.g., third-party systems, such as the translation server 224), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 226 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 232 corresponding to a particular photo may have a privacy setting specifying that the photo may only be accessed by users tagged in the photo and their friends. In particular embodiments, privacy settings may allow users to opt in or opt out of having their actions logged by social-networking system 226 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social-networking system 226 may send a request to the data store for the object. The request may identify the user associated with the request. The requested data object may only be sent to the user (or a client system 210 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network that may benefit from the above-described classifier and/or translation system. Targeting criteria used to identify and target users may include explicit, stated user interests on social-networking server 226 or explicit connections of a user to a node, object, entity, brand, or page on social-networking server 226. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting;

deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

Figure 11:
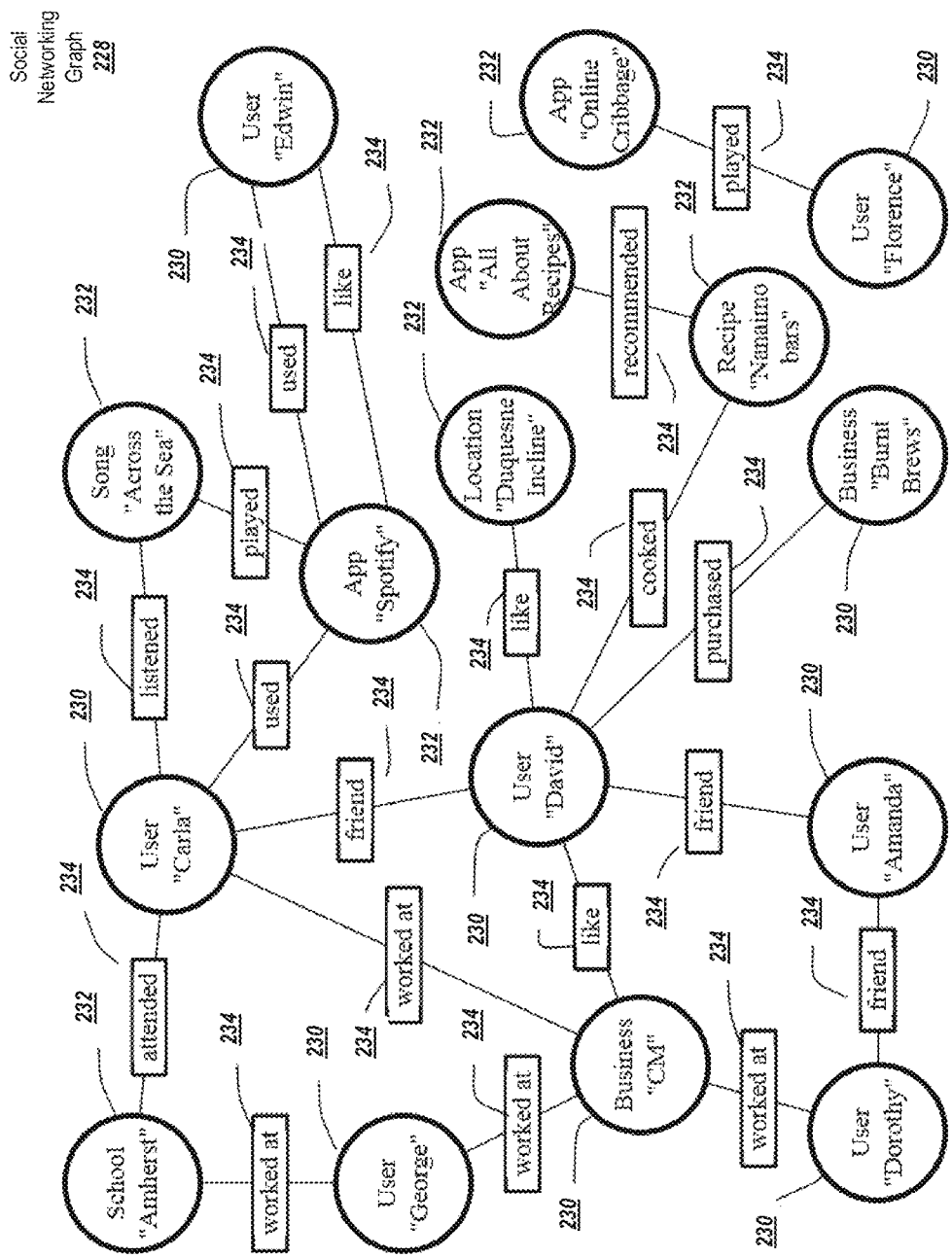
FIG. 11 describes the social networking graph depicted in FIG. 10 in more detail.

FIG. 11 illustrates an example of a social graph 228. In exemplary embodiments, a social-networking service may store one or more social graphs 228 in one or more data stores as a social graph data structure via the social networking service.

The social graph 228 may include multiple nodes, such as user nodes 230 and concept nodes 232. The social graph 228 may furthermore include edges 234 connecting the nodes. The nodes and edges of social graph 228 may be stored as data objects, for example, in a data store (such as a social-graph database). Such a data store may include one or more searchable or queryable indexes of nodes or edges of social graph 228.

The social graph 228 may be accessed by a social-networking server 226, client system 210, third-party system (e.g., the translation server 224), or any other approved system or device for suitable applications.

A user node 230 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 230 corresponding to the user, and store the user node 30 in one or more data stores. Users and user nodes 230 described herein may, where appropriate, refer to registered users and user nodes 230 associated with registered users. In addition, or as an alternative, users and user nodes 230 described herein may, where appropriate, refer to users that have not registered with the social-networking system. In particular embodiments, a user node 230 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 230 may be associated with one or more data objects corresponding to information associated with a user. In particular embodiments, a user node 230 may correspond to one or more webpages. A user node 230 may be associated with a unique user identifier for the user in the social-networking system.

In particular embodiments, a concept node 232 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 232 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 232 may be associated with one or more data objects corresponding to information associated with concept node 232. In particular embodiments, a concept node 232 may correspond to one or more webpages.

In particular embodiments, a node in social graph 228 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 232. Profile pages may be viewable by all or a selected subset of other users. As an example and not by way of limitation, a user node 230 may have a corresponding user-profile page in which the corresponding user may add content, make declarations, or otherwise express himself or herself. A business page such as business page 205 may comprise a user-profile page for a commerce entity. As another example and not by way of limitation, a concept node 232 may have a corresponding concept-profile page in which one or more users may add content, make declarations, or express themselves, particularly in relation to the concept corresponding to concept node 232.

In particular embodiments, a concept node 232 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system 140 a message indicating the user's action. In response to the message, the social-networking system 140 may create an edge (e.g., an "eat" edge) between a user node 230 corresponding to the user and a concept node 232 corresponding to the third-party webpage or resource and store edge 234 in one or more data stores.

In particular embodiments, a pair of nodes in social graph 228 may be connected to each other by one or more edges 234. An edge 234 connecting a pair of nodes may represent a relationship between the pair of nodes. In particular embodiments, an edge 234 may include or represent one or more data objects or attributes corresponding to the relationship between a pair of nodes. As an example and not by way of limitation, a first user may indicate that a second user is a "friend" of the first user. In response to this indication, the social-networking system 140 may send a "friend request" to the second user. If the second user confirms the "friend request," the social-networking system may create an edge 234 connecting the first user's user node 230 to the second user's user node 230 in social graph 228 and store edge 234 as social-graph information in one or more data stores. In the example of FIG. 11, social graph 228 includes an edge 234 indicating a friend relation between user nodes 230 of user "Amanda" and user "Dorothy." Although this disclosure describes or illustrates particular edges 234 with particular attributes connecting particular user nodes 230, this disclosure contemplates any suitable edges 234 with any suitable attributes connecting user nodes 230. As an example and not by way of limitation, an edge 234 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 228 by one or more edges 234.

In particular embodiments, an edge 234 between a user node 230 and a concept node 232 may represent a particular action or activity performed by a user associated with user node 230 toward a concept associated with a concept node 232. As an example and not by way of limitation, as illustrated in FIG. 11, a user may "like," "attended," "played," "listened," "cooked," "worked at," or "watched" a concept, each of which may correspond to a edge type or subtype. A concept-profile page corresponding to a concept node 232 may include, for example, a selectable "check in" icon (such as, for example, a clickable "check in" icon) or a selectable "add to favorites" icon. Similarly, after a user clicks these icons, the social-networking system 140 may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system 140 may create a "listened" edge 234 and a "used" edge (as illustrated in FIG. 2) between user nodes 230 corresponding to the user and concept nodes 232 corresponding to the song and application to indicate that the user listened to the song and used the application. Moreover, the social-networking system 140 may create a "played" edge 234 (as illustrated in FIG. 11) between concept nodes 232 corresponding to the song and the application to indicate that the particular song was played by the particular application. In this case, "played" edge 234 corresponds to an action performed by an external application (SPOTIFY) on an external audio file (the song "Across the Sea"). Although this disclosure describes particular edges 234 with particular attributes connecting user nodes 230 and concept nodes 232, this disclosure contemplates any suitable edges 234 with any suitable attributes connecting user nodes 230 and concept nodes 232. Moreover, although this disclosure describes edges between a user node 230 and a concept node 232 representing a single relationship, this disclosure contemplates edges between a user node 230 and a concept node 232 representing one or more relationships. As an example and not by way of limitation, an edge 234 may represent both that a user likes and has used at a particular concept. Alternatively, another edge 234 may represent each type of relationship (or multiples of a single relationship) between a user node 230 and a concept node 232 (as illustrated in FIG. 11 between user node 230 for user "Edwin" and concept node 232 for "SPOTIFY").

In particular embodiments, the social-networking system 140 may create an edge 234 between a user node 230 and a concept node 232 in social graph 228. As an example and not by way of limitation, a user viewing a concept-profile page (such as, for example, by using a web browser or a special-purpose application hosted by the user's client system) may indicate that he or she likes the concept represented by the concept node 232 by clicking or selecting a "Like" icon, which may cause the user's client system to send to the social-networking system a message indicating the user's liking of the concept associated with the concept-profile page. In response to the message, the social-networking system may create an edge 234 between user node 230 associated with the user and concept node 232, as illustrated by "like" edge 234 between the user and concept node 232. In particular embodiments, the social-networking system 140 may store an edge 234 in one or more data stores. In particular embodiments, an edge 234 may be automatically formed by the social-networking system in response to a particular user action. As an example and not by way of limitation, if a first user uploads a picture, watches a movie, or listens to a song, an edge 234 may be formed between user node 230 corresponding to the first user and concept nodes 232 corresponding to those concepts. Although this disclosure describes forming particular edges 234 in particular manners, this disclosure contemplates forming any suitable edges 234 in any suitable manner.

The social graph 228 may further comprise a plurality of product nodes. Product nodes may represent particular products that may be associated with a particular business. A business may provide a product catalog to a consumer-to-business service and the consumer-to-business service may therefore represent each of the products within the product in the social graph 228 with each product being in a distinct product node. A product node may comprise information relating to the product, such as pricing information, descriptive information, manufacturer information, availability information, and other relevant information. For example, each of the items on a menu for a restaurant may be represented within the social graph 228 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 228. The information for a product node may be manipulated by the social-networking system as a product object that encapsulates information regarding the referenced product.

As such, the social graph 228 may be used to infer shared interests, shared experiences, or other shared or common attributes of two or more users of a social-networking system. For instance, two or more users each having an edge to a common business, product, media item, institution, or other entity represented in the social graph 228 may indicate a shared relationship with that entity, which may be used to suggest customization of a use of a social-networking system, including a messaging system, for one or more users.

Computer-Related Embodiments

Figure 12:
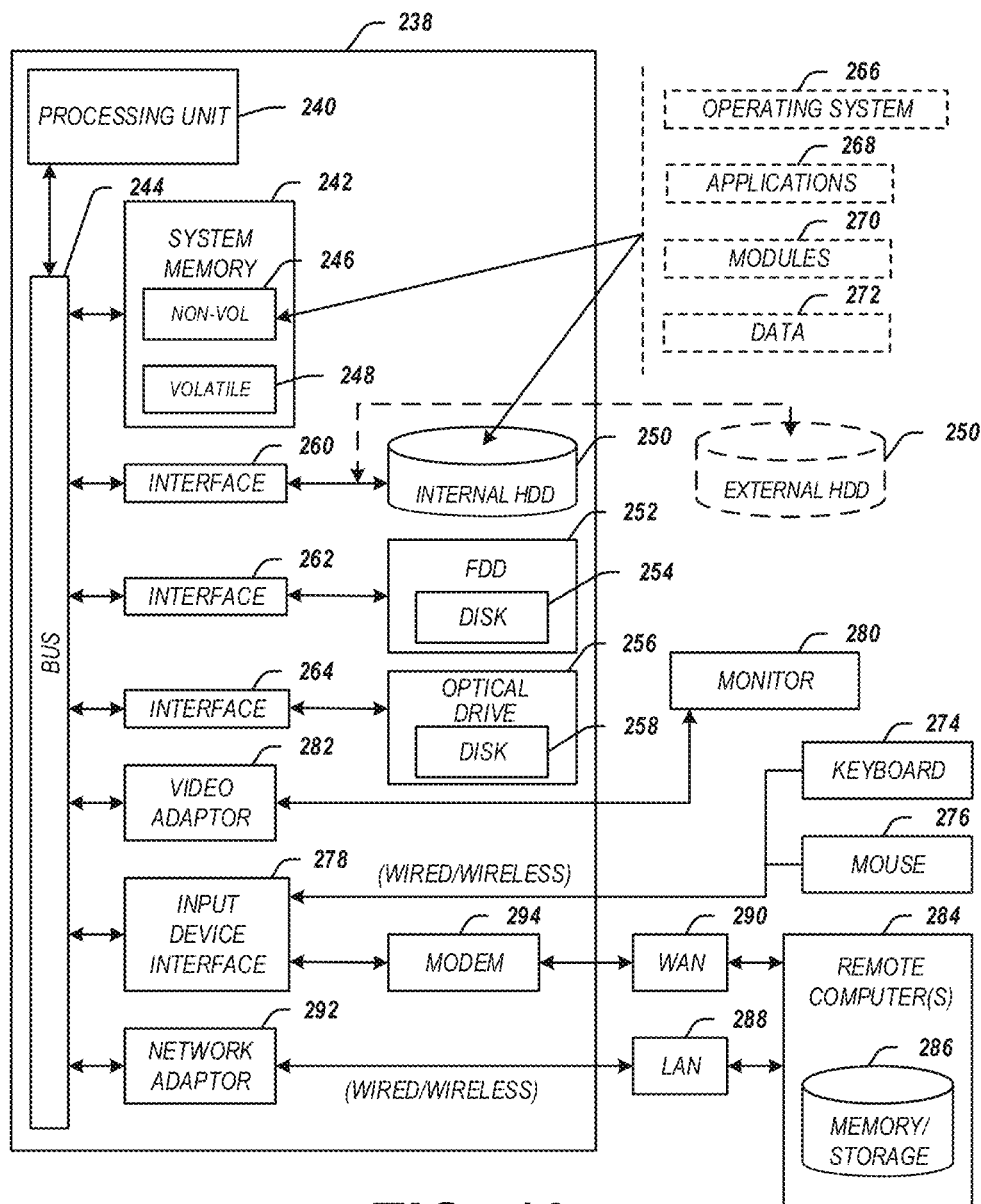
FIG. 12 depicts an exemplary computing device suitable for use with exemplary embodiments.

FIG. 12 illustrates an embodiment of an exemplary computing architecture 236 suitable for implementing various embodiments as previously described. The above-described methods, for example, may be embodied as instructions on a computer readable medium or as part of the computing architecture 236. In one embodiment, the computing architecture 236 may comprise or be implemented as part of an electronic device. Examples of an electronic device may include those described with reference to FIG. 12, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 236. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 236 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 236.

As shown in FIG. 12, the computing architecture 236 comprises a processing unit 240, a system memory 242 and a system bus 244. The processing unit 240 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 240.

The system bus 244 provides an interface for system components including, but not limited to, the system memory 242 to the processing unit 240. The system bus 244 can be any of several types of bus structure that may further interconnect to a memory bus (with or without a memory controller), a peripheral bus, and a local bus using any of a variety of commercially available bus architectures. Interface adapters may connect to the system bus 244 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 236 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 242 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 242 can include non-volatile memory 246 and/or volatile memory 248. A basic input/output system (BIOS) can be stored in the non-volatile memory 246.

The computer 238 may include various types of computer-readable storage media in the form of one or more lower speed memory units, including an internal (or external) hard disk drive (HDD) 250, a magnetic floppy disk drive (FDD) 252 to read from or write to a removable magnetic disk 254, and an optical disk drive 256 to read from or write to a removable optical disk 258 (e.g., a CD-ROM or DVD). The HDD 250, FDD 252 and optical disk drive 256 can be connected to the system bus 244 by a HDD interface 260, an FDD interface 262 and an optical drive interface 264, respectively. The HDD interface 260 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 246, 248, including an operating system 266, one or more application programs 268, other program modules 270, and program data 272. In one embodiment, the one or more application programs 268, other program modules 270, and program data 272 can include, for example, the various applications and/or components of the system 30.

A user can enter commands and information into the computer 238 through one or more wire/wireless input devices, for example, a keyboard 274 and a pointing device, such as a mouse 276. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 278 that is coupled to the system bus 244, but can be connected by other interfaces such as a parallel port, IEEE 694 serial port, a game port, a USB port, an IR interface, and so forth.

A monitor 280 or other type of display device is also connected to the system bus 244 via an interface, such as a video adaptor 282. The monitor 280 may be internal or external to the computer 238. In addition to the monitor 280, a computer typically includes other peripheral output devices, such as speakers, printers, and so forth.

The computer 238 may operate in a networked environment using logical connections via wire and/or wireless communications to one or more remote computers, such as a remote computer 284. The remote computer 284 can be a workstation, a server computer, a router, a personal computer, portable computer, microprocessor-based entertainment appliance, a peer device or other common network node, and typically includes many or all of the elements described relative to the computer 238, although, for purposes of brevity, only a memory/storage device 286 is illustrated. The logical connections depicted include wire/wireless connectivity to a local area network (LAN) 288 and/or larger networks, for example, a wide area network (WAN) 290. Such LAN and WAN networking environments are commonplace in offices and companies, and facilitate enterprise-wide computer networks, such as intranets, all of which may connect to a global communications network, for example, the Internet.

When used in a LAN networking environment, the computer 238 is connected to the LAN 288 through a wire and/or wireless communication network interface or adaptor 292. The adaptor 292 can facilitate wire and/or wireless communications to the LAN 288, which may also include a wireless access point disposed thereon for communicating with the wireless functionality of the adaptor 292.

When used in a WAN networking environment, the computer 238 can include a modem 294, or is connected to a communications server on the WAN 290, or has other means for establishing communications over the WAN 290, such as by way of the Internet. The modem 294, which can be internal or external and a wire and/or wireless device, connects to the system bus 244 via the input device interface 278. In a networked environment, program modules depicted relative to the computer 238, or portions thereof, can be stored in the remote memory/storage device 286. It will be appreciated that the network connections shown are exemplary and other means of establishing a communications link between the computers can be used.

The computer 238 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
 receiving, by a task completion service, an input comprising information in a natural language;
 determining, by a dialog manager of the task completion service, an intent of the input;
 determining, by the dialog manager, target information to fulfill the intent;
 identifying, by the dialog manager, one or both of information among the target information that is available to the dialog manager or information among the target information that is not available to the dialog manager;
 generating a conversational understanding document comprising the intent and the identified information; and
 forwarding the conversational understanding document to a task completion handler separate from the dialog manager.

2. The method of claim 1, further comprising selecting, at the task completion handler, missing information from among the identified information, and guiding, at the task completion handler, a conversation to request the selected information, wherein the updated information is received by the dialog manager in response to the conversation requesting the selected information.

3. The method of claim 2, further comprising:
 determining that the missing information is not relevant in a context in which the input was provided; and
 refraining from requesting the determined irrelevant information during the conversation.

4. The method of claim 2, wherein the task completion handler selects which missing information to request and determines an order to request the missing information.

5. The method of claim 1, wherein a plurality of task completion handlers are capable of servicing the conversational understanding document, and further comprising:
 providing the conversational understanding document to a broker accessible to the plurality of task completion handlers; and
 identifying, using the broker, one of the plurality of task completion handlers for servicing the conversational understanding document.

6. The method of claim 1, wherein determining the intent of the input comprises searching among a list storing a plurality of predetermined intents, and further comprising:
 adding a new custom intent to the list.

7. The method of claim 1, wherein the dialog manager maintains a state of a conversation directed by the task completion handler, and further comprising:
 receiving updated information at the dialog manager;
 updating the conversational understanding document; and
 forwarding the updated conversational understanding document towards the task completion handler.

8. A non-transitory computer-readable medium storing instructions that are configured to cause one or more processors to:
 receive, at a task completion service, an input comprising information in a natural language;
 determine, at a dialog manager of the task completion service, an intent of the input;
 determine, at the dialog manager, target information to fulfill the intent;
 identify, at the dialog manager, one or both of information among the target information that is available to the dialog manager or information among the target information that is not available to the dialog manager;
 generate a conversational understanding document comprising the intent and the identified information; and
 forward the conversational understanding document to a task completion handler separate from the dialog manager.

9. The non-transitory medium of claim 8, further storing instructions configured to cause the one or more processors to select, at the task completion handler, missing information from among the identified information, and guide, at the task completion handler, a conversation to request the selected information, wherein the updated information is received by the dialog manager in response to the conversation requesting the selected information.

10. The non-transitory medium of claim 9, further storing instructions configured to cause the one or more processors to:
 determine that the missing information is not relevant in a context in which the input was provided; and refrain from requesting the determined irrelevant information during the conversation.

11. The non-transitory medium of claim 9, wherein the instructions are configured to cause the task completion handler to select which missing information to request, and to determine an order to request the missing information.

12. The non-transitory medium of claim 8, wherein a plurality of task completion handlers are capable of servicing the conversational understanding document, and further storing instructions configured to cause the one or more processors to:
provide the conversational understanding document to a broker accessible to the plurality of task completion handlers; and
identify, using the broker, one of the plurality of task completion handlers for servicing the conversational understanding document.

13. The non-transitory medium of claim 8, wherein determining the intent of the input comprises searching among a list storing a plurality of predetermined intents, and further storing instructions configured to cause the one or more processors to add a new custom intent to the list.

14. The non-transitory medium of claim 8, wherein the dialog manager maintains a state of a conversation directed by the task completion handler, and further storing instructions for:
receiving updated information at the dialog manager;
updating the conversational understanding document; and
forwarding the updated conversational understanding document towards the task completion handler.

15. An apparatus comprising:
a computer-implemented input interface to receive an input comprising information in a natural language;
a dialog manager to determine an intent of the input, determine target information to fulfill the intent, and identify one or both of information among the target information that is available to the dialog manager or information among the target information that is not available to the dialog manager;
a conversational understanding document to comprise the intent and the identified information; and
an output interface to forward the intent document to a task completion handler separate from the dialog manager.

16. The system of claim 15, further comprising the task completion handler, wherein the task completion handler is configured to select missing information from among the identified information and guide a conversation to request the selected information, wherein the updated information is received by the dialog manager in response to the conversation requesting the selected information.

17. The system of claim 16, wherein the task completion handler is configured to determine that the missing information is not relevant in a context in which the input was provided, and to refrain from requesting the determined irrelevant information during the conversation.

18. The system of claim 16, wherein the task completion handler is configured to select which missing information to request, and to determine an order to request the missing information.

19. The system of claim 15, wherein a plurality of task completion handlers are capable of servicing the intent document, and further comprising a broker accessible to the plurality of task completion handlers, the broker configured to:
receive the conversational understanding document; and
identify one of the plurality of task completion handlers for servicing the conversational understanding document.

20. The system of claim 15, wherein determining the intent of the input comprises searching among a list storing a plurality of predetermined intents, and further comprising logic configured to add a new custom intent to the list.

* * * * *